(12) United States Patent
Park

(10) Patent No.: US 10,598,820 B2
(45) Date of Patent: Mar. 24, 2020

(54) APPARATUS AND METHOD FOR MEASURING AMOUNT OF SNOWFALL FOR VINYL HOUSE

(71) Applicant: INDUSTRIAL COOPERATION FOUNDATION CHONBUK NATIONAL UNIVERSITY, Jeonju-si, Jeollabuk-do (KR)

(72) Inventor: Jeong Ki Park, Jeonju-si (KR)

(73) Assignee: INDUSTRIAL COOPERATION FOUNDATION CHONBUK NATIONAL UNIVERSITY (KR)

( * ) Notice: Subject to any disclaimer, the term of this patent is extended or adjusted under 35 U.S.C. 154(b) by 515 days.

(21) Appl. No.: 15/633,751

(22) Filed: Jun. 26, 2017

(65) Prior Publication Data
US 2018/0143349 A1    May 24, 2018

(30) Foreign Application Priority Data
Nov. 18, 2016  (KR) .......................... 10-2016-0153959

(51) Int. Cl.
*G01W 1/14*  (2006.01)
*G01S 13/88*  (2006.01)

(52) U.S. Cl.
CPC ............... *G01W 1/14* (2013.01); *G01S 13/88* (2013.01)

(58) Field of Classification Search
CPC ....... G01W 1/14; G01S 13/885; G01S 13/887
USPC ........................................................ 342/26 D
See application file for complete search history.

(56) References Cited

U.S. PATENT DOCUMENTS

| | | | |
|---|---|---|---|
| 6,166,681 A * | 12/2000 | Meszaros .............. | C21C 5/4673 342/124 |
| 6,295,868 B1 * | 10/2001 | Cooper .................... | G01G 5/04 73/170.23 |
| 2011/0298647 A1 * | 12/2011 | Long ..................... | G01S 13/887 342/22 |
| 2017/0212233 A1 * | 7/2017 | Mousavi ............... | G01F 23/284 |

FOREIGN PATENT DOCUMENTS

| KR | 100348574 A | 6/2003 |
|---|---|---|
| KR | 101509108 B1 | 4/2015 |
| KR | 101634211 B1 | 6/2016 |

* cited by examiner

*Primary Examiner* — Peter M Bythrow
*Assistant Examiner* — Helena H Seraydaryan
(74) *Attorney, Agent, or Firm* — Renaissance IP Law Group LLP

(57) ABSTRACT

The present invention relates to an apparatus and method for measuring snowfall amount for a green (vinyl) house, particularly, relates to measuring the width of snow accumulated on the roof of a green house, by analyzing measurement data including intensity, velocity (speed), wavelength or the combinations thereof of radio waves which are varied by medium of vinyl or snow by using a radar sensor.

11 Claims, 5 Drawing Sheets

① Driving measuring module(radar sensor)
② Measuring intensity, velocity (speed), wavelength, etc. of radio waves, which are received or reflected from the measuring module
③ Analyzing by comparing the measured data varied by medium such as snow and vinyl with the reference data.
④ Identifying snowfall amount piled on the roof of a vinyl house
⑤ Displaying the information pertaining to snowfall amount, warning information and countermeasures, or transmitting the information to a user terminal ① Driving measuring module(radar sensor)
② Measuring intensity, velocity (speed), wavelength, etc. of radio waves, which are received or reflected from the measuring module
③ Analyzing by comparing the measured data varied by medium such as snow and vinyl with the reference data.
④ Identifying snowfall amount piled on the roof of a vinyl house
⑤ Displaying the information pertaining to snowfall amount, warning information and countermeasures, or transmitting the information to a user terminal

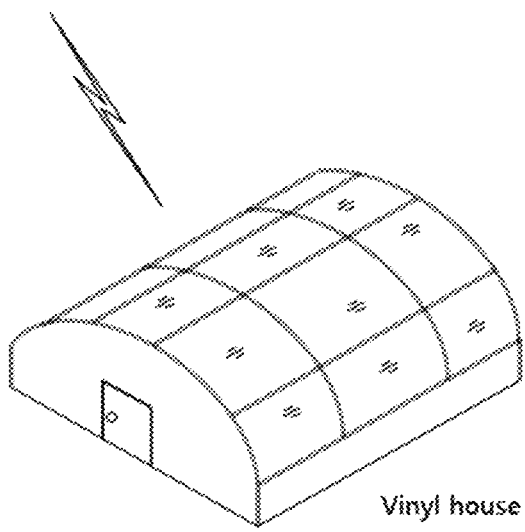

FIG. 1

APPARATUS AND METHOD FOR MEASURING AMOUNT OF SNOWFALL FOR VINYL HOUSE

BACKGROUND

The present invention relates to an apparatus and method for measuring snowfall amount for a vinyl house, more particularly, relates to measuring the width of snow accumulated on the roof of a green(vinyl) house, by analyzing measurement data including intensity, velocity(speed), wavelength or the combinations thereof of radio waves which are varied by medium of vinyl or snow by using a radar (radar, radio detection and ranging) sensor.

The present invention was supported by both the MSIP (Ministry of Science, ICT and Future Planning), Korea, under the ITRC (Information Technology Research Center) support program (1711035204 (HTP-2017-2015-0-00378)) supervised by th HTP (Institute for Information & communication Technology Promotion).

It has important meaning as data of future weather forecast to measure and analyze the accurate snowfall in winter. Especially, in the case of a farmhouse using a vinyl house, an accident that the vinyl house is collapsed due to the weight of the snow piled up on the roof of the vinyl house may occur in winter, so it is necessary to accurately measure the snow amount and load accumulated in the vinyl house.

There exist two methods od measuring snowfall amount. One is measuring height of snowfall and the other is measuring mass or volume of snow accumulated in a certain area. In the casse of measuring height of snow, there are ultrasonic snowfall amount meter and optical snowfall amount meter using laser sensor.

Conventionally, the measurement of snowfall on the ground was performed based on the distance between the ground and the snow-covered surface using the laser sensor.

However, conventional laser sensors used for snowfall measurement have difficulty in performing normal measurement when there is a blocking object or an obstacle at the place where the snowfall amount is measured and between the ground to be measured and the surface of accumulated snow, and there is a problem that the system implementation is very complicated and therefore expensive in this case.

For example, in the case that one wants to measure the amount of snowfall using a laser sensor in a special environment such as a vinyl house, not on the ground, it may be impossible to measure the distance between the laser sensor and the vinyl house roof which is the reference point, because the laser is passed without being reflected, absorbed or reflected by the obstacle on the roof surface which is a reference point by a blocking object or an obstacle such as the material of the vinyl, the barrier of the sunlight outside the vinyl house. As a result, the thickness of the snow piled on the roof of the vinyl house can not he normally measured.

Accordingly, the present invention proposes a method of thickness of snow piled on the roof of a vinyl house, through analyzing by measuring the radio waves which are varied by a medium such as vinyl, snow, etc. through a radar sensor in a specific environment such as a vinyl house.

Next, a brief description of the prior arts existing in the technical field of the present invention will be given, and then technical matters which the present invention intends to differentiate from the prior arts will be described.

At first, Korean patent registration No. 0348574 (published on Jun. 12, 2003) relates to an apparatus and method for measuring snowfall amount performing measurement of snow amount accumulated in remote area such as mountainous areas, insular and isolated areas, etc., and especially accurately measuring the optimum amount of snowfall for a certain period of time by sensing the height of the snow at regular intervals using a laser distance sensor.

The above-described prior art provides an effect that a correct snowfall amount can be quickly recognized even during a snowfall using a laser distance sensor, and an optimal snowfall amount can be obtained accurately while minimizing an error. Thereby there is some similarities with the present invention in that accurate snowfall is measured using reflected signal analysis.

However, since the present invention provides a technical structure capable of measuring thickness of snow piled on the roof of a vinyl house using a radar sensor, and the thickness can not be measured by the laser sensor of the prior art, And, thus the difference in the technical characteristics is clear when compared with the technical constitution of the prior art.

In addition, Korean patent registration 1509108 (Apr. 14, 2015) relates to a snowfall measuring device and its operating method, more specifically, it relates to a snowfall measuring device and its operating method capable of measuring the snowfall amount accurately in real time by minimizing error. This prior art enables a managing part continuously to remove moisture, snow, or ice stained in sensor part of the measuring part drawn or stored from the moving part which reciprocates the support rod and maintains the sensor part in clean state, and thus makes effects of minimizing errors and providing an accurate measurement of snowfall amount in real time.

However, the prior art is configured to which the sensor is moved up and down and contacts with the accumulated snow and measures the amount of snow accumulated on the ground. On the other hands, the present invention is configured to measure and analyze radio waves that are changed by a medium such as vinyl or snow through a radar sensor in a specific environment such as a vinyl house, so It can be confirmed that the difference between the prior art and the present invention in the technical construction is clear.

In addition, Korean patent registration 1634211(Jun. 28, 2016) relates to a snow removal system for a green house, and a snow removal method for a green house using the same, which can promote crop growth by protecting vinyl houses from natural disasters such as heavy snow, strong winds and high temperatures.

The above-mentioned prior art is capable of generating heat and wind at the inside and outside of the vinyl house at the time of heavy snow and abnormal weight of the snow compared to previously set weight, and thus it is possible to protect the crops safely by preventing the collapse of the green house during heavy snowfall. There is some similarity with the present invention in that the collapse of the green house can be prevented through accurate measurement of the snowfall amount.

However, unlike the prior art in which the weight of snow piled on the roof of a vinyl house is measured using a weight sensor, the present invention provides technical configurations of measuring and analyzing a radio wave that is changed by a medium such as vinyl or snow through a radar sensor, and then measuring the thickness of snow piled on the roof of a vinyl house based on the analysis results.

That is, the technology for measuring snowfall amount using a radar sensor proposed in the present invention is a characteristic composition of the present invention which is not mentioned in the prior art at all.

Since each of the above-mentioned prior art uses a laser sensor, they can not measure the thickness of snow on the roof of a vinyl house in a special environment such as a vinyl house. And since these provide technological configurations that can prevent the collapse of the vinyl house based on the weight of the snow measured using a weight sensor, there exists clear technical difference between the constitution of above-mentioned prior arts and that of the present invention in that the present invention provides a technology to measure the thickness of snow piled on the roof of a vinyl house based on the results of measuring and analyzing the radio waves that are changed by medium such as vinyl or snow through a radar sensor in a specific environment such as a vinyl house.

SUMMARY

The present invention is composed for resolving the above problems, and it is ojective for the present invention to provide an apparatus and method for measuring snowfall amount for a vinyl house, in which a radar sensor can be used to accurately measure the thickness of snow piled on the roof of a vinyl house.

In addition, it is another ojective for the present invention to provide an apparatus and method for measuring snowfall amount for a vinyl house, in which a radar sensor with transmitting function or a radar sensor with receiving function is installed at a predetermined position inside and outside the vinyl house, the measurement data including intensity, speed, wavelength or combinations thereof of radio waves that are changed by the medium such as vinyl or snow measured by receiving the radio waves output from the transmitter on the receiver side are analyzed, and thus the thickness of snow piled on the roof of the vinyl house is measured.

In addition, it is another ojective for the present invention to provide an apparatus and method for measuring snowfall amount for a vinyl house, in which a radar sensor or a reflector integrated with transmitting and receiving functions nstalled at a predetermined position inside and outside the vinyl house, the measurement data including the intensity, speed, wavelength or the combinations thereof of radio waves which are changed by the medium of vinyl or snow and measured by receiving radio wave reflected by the reflector and outputted from radar sensor, are analyzed, and thus the thickness of snow piled on the roof of the vinyl house is measured.

An apparatus for measuring snowfall amount on a green house in accordance with an embodiment of the present invention, is configured to comprise: a measuring module condigured to measure intensity, speed, wavelength, or the combinations thereof of radio waves, which are varied by medium including vinyl and snow piled on the roof of a green house; and a snowfall amount analyzer configured to compare the measurement data measured by the measuring module with previously stored reference data, and identify the thickness of the snow piled on the roof of the green house; wherein the reference data is constructed as a table, which comprises vinyl information including composition, material, thickness, or the combinations thereof, and the propagation characteristics according to each previously measured snowfall amount.

The measuring module comprises a radar sensor of which ansmitter and a receiver are separated, and the transmitter and the receiver are separately installed inside or outside the green house, and a radar sensor of which a transmitter and a receiver are integrated, and the transmitter and the receiver are installed inside or outside the green house.

In addition, the apparatus for measuring snowfall amount is configured to further comprise: a reflector installed at a position corresponding to the direction for radio waves output of the measuring module, and reflecting radio waves output from the measuring module.

Wherein the reflector is installed outside or inside the roof of the green house, which corresponds to the position of the measuring module installed inside or outside the green house; and one or more of the reflector are installed at intervals in the green house.

In addition, the apparatus for measuring snowfall amount is configured to further comprise: a display configured to display information data including thickness of snow piled on the roof of the green house which is identified by the snowfall amount analyzer, warning information corresponding to the thickness of the snow, countermeasures or the combinations thereof; and an information provider configured to transmit information data including thickness of snow piled on the roof of the green house which is identified by the snowfall amount analyzer, warning information corresponding to the thickness of the snow, countermeasures or the combinations thereof to a predetermined user terminal.

A method for measuring snowfall amount on a green house in accordance with an embodiment of the present invention, is configured to comprise: measuring, in an apparatus for measuring snowfall amount, intensity, speed, wavelength, or the combinations thereof of radio waves, which are varied by medium including vinyl and snow piled on the roof of a green house; and alanyzing a snowfall amount by comparing the measurement data measured by the measuring module with previously stored reference data, and identifying the thickness of the snow piled on the roof of the green house; wherein the reference data is constructed as a table, which comprises vinyl information including composition, material, thickness, or the combinations thereof, and the propagation characteristics according to each previously measured snowfall amount.

Wherein, the measurement comprises measuring intensity, speed, wavelength, or the combinations thereof of radio waves, which are varied by medium by using a measuring module comprising a radar sensor of which a transmitter and a receiver are separated, and the transmitter and the receiver are separately installed inside or outside the green house. And the measurement comprises measuring intensity, speed, wavelength, or the combinations thereof of radio waves, which are varied by medium by using a measuring module comprising a radar sensor of which a transmitter and a receiver are integrated, and the transmitter and the receiver are installed inside or outside the green house.

Wherein the measuring module measures intensity, speed, wavelength, or the combinations thereof of radio waves, which are varied by medium with receiving radio waves reflected through a reflector installed at a position corresponding to the direction for radio waves output of the measuring module; and the reflector is installed outside or inside the roof of the green house, which corresponds to the position of the measuring module installed inside or outside the green house, and one or more of the reflector are installed at intervals in the green house.

The method for measuring snowfall amount further comprises: displaying information data including thickness of snow piled on the roof of the green house which is identified by analyzing the snowfall amount, warning information corresponding to the thickness of the snow, countermeasures or the combinations thereof; and transmitting information data including thickness of snow piled on the roof of the green house which is identified by analyzing the snowfall amount, warning information corresponding to the thickness of the snow, countermeasures or the combinations thereof to a predetermined user terminal.

As described above, the apparatus and method for measuring snowfall amount for a vinyl house in accordance with the present invention can acurately measure the thickness of snow piled on the roof of a green house by using radar sensor, which is impossible to measure the snowfall amount with conventional mainly used methods of measuring the amount of snowfall by using laser, and thus snowfall measurement system can be simplt built at low cost in accordance with the present invention, it is possible to accurately measure the snow on the roof of a vinyl house even in a special environment such as a vinyl house, and therefore it is possible to prevent the collapse of the vinyl house in the farmhouse due to heavy snowfall referring to the accurate measurement of snowfall.

Moreover, the apparatus and method for measuring snowfall amount for a vinyl house in accordance with the present invention uses a radarsensor separated by transmitter and receiver, or uses a reflector and a radar sensor integrated with transmission and reception functions, and accurately measures the thickness of the snow on the roof of a vinyl house, and thus it is possible to freely install and operate the snowfall measurement system according to the location, installation condition, structure of the vinyl house, and it makes maintenance very easy.

BRIEF DESCRIPTION OF THE DRAWINGS

For more complete understanding of this disclosure, reference is now made to the following brief description, taken in connection with the accompanying drawings and detailed description.

FIG. 1 is a conceptual diagram for explaining processes of measuring snowfall amount for a green house in accordance with the present invention.

DETAILED DESCRIPTION

Figure 2:
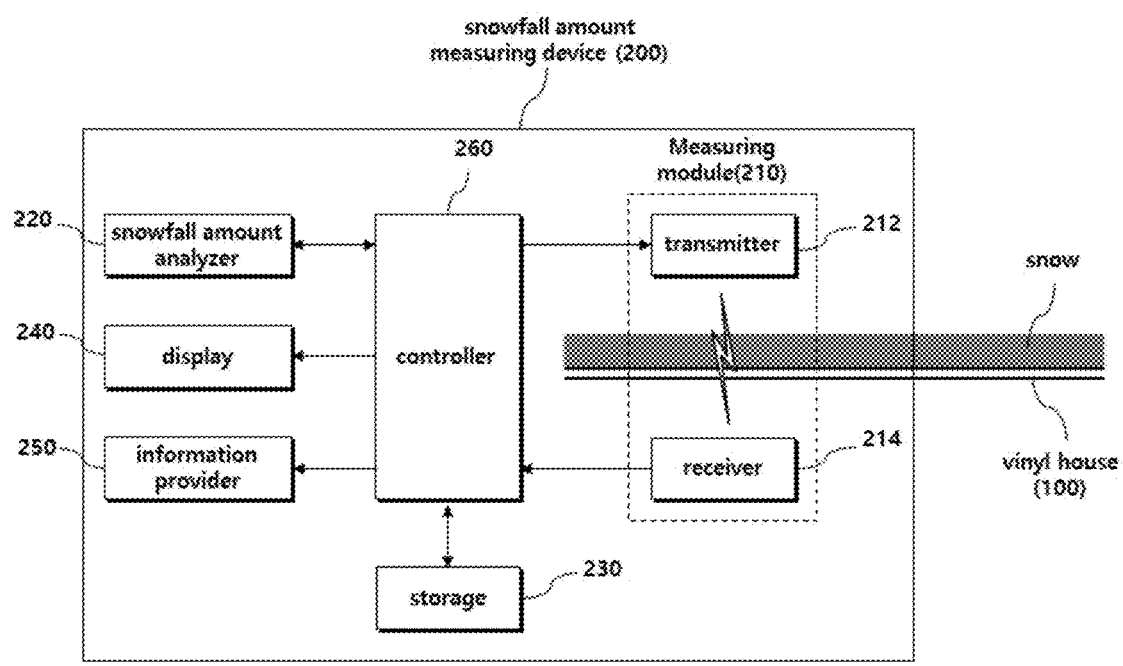
FIG. 2 is a drawing for briefly showing the configuration of a device of measuring snowfall amount for a green house in accordance with an embodiment of the present invention.

Hereinafter, preferred embodiments of the present invention, an apparatus and method for measuring snowfall amount for a vinyl house, are explained in detail with reference to accompanying figures. The same reference sign in each figure represents the same component. In addition, the specific structural or functional explanation for embodiments of the present invention is used for exemplifying the embodiments only and all the terms including technical and scientific terms used in this document have the same meaning, unless defined differently, as the meaning generally understood by those who have ordinary knowledge in the technical area the present invention belongs to. The terms defined in commonly used dictionaries are interpreted as the same meaning coincident with the contextual meaning in the related technology and if not explicitly defined in this specification, it is preferable not to be interpreted as too ideal or perfunctory meaning.

FIG. 1 is a conceptual diagram for explaining processes of measuring snowfall arnou for a green house in accordance with the present invention.

As shown in FIG. 1, a snowfall amount measuring device for measuring the thickness of snow piled on the roof of a vinyl house is installed at a predetermined position inside or outside the vinyl house. It is usually preferable to install the device inside the vinyl house in order to be less influenced by the outside environment.

A measurement module for measuring the intensity, speed, wavelength, or the combinations thereof of radio wave which is changed by a medium such as vinyl and snow, a controller for analyzing the thickness of the snow piled on the roof of the vinyl house on the basis of the data measured by the measurement module and for generating and providing information related to the snowfall amount and the corresponding countermeasures, a display for performing outputting of information related to the current snowfall amount and countermeasures, or an information provider and the like are electrically connected in the snowfall amount measuring device.

At this time, the measuring module uses a radar sensor that uses radio waves that can pass through materials such as vinyl and snow. This is because the conventional laser sensor mainly used for measuring the snowfall amount can not normally measure the thickness of the snow piled on the vinyl house roof because the laser passes through depending on the material of the vinyl or is absorbed or reflected by the blocking objects or obstacle.

The radar sensor separates the transmitting function and the receiving function, so that the radar sensor of the transmitting function is installed outside the roof of the vinyl house, and the radar sensor of the receiving function is installed inside the roof of the vinyl house, or on the contrary It is preferable that the radar sensor of the transmitting function is installed inside the roof of the vinyl house and the radar sensor of the receiving function is installed outside the roof of the vinyl house.

The radar sensor can be installed at a predetermined position inside or outside the vinyl house by integrating the transmitting and receiving functions in addition to the separable structure as described above. When the integrated radar sensor is used, a separate reflection plate is additionally provided at a position corresponding to the radio wave output direction so that the radio wave output from the radar sensor is reflected by the reflection plate. It is preferable that the reflector is installed inside the roof of the vinyl house in the case that the integrated type radar sensor is installed outside the roof of the vinyl house, the reflector is installed outside the roof of the vinyl house in the case that the integrated type radar sensor is installed. inside the roof of the vinyl house.

The snowfall measuring device measures the thickness of snow accumulated on the roof of the vinyl house on the basis of measurement data including the intensity, speed, wavelength, or the combinations thereof of the radio waves changed by the media such as vinyl and snow transmitted from the measuring module composed of the radar sensor, and displays information relating to current snowfall amount information, warning information, and countermeasures, or provides the information to a user terminal held by the user so that the user can perform an appropriate response.

The processes of measuring snowfall amount for vinyl uses will be described in detail as follows.

First, when it becomes time (snowfall amount measuring time) to measure the thickness of snow piled on the roof of the vinyl house is reached, the measuring module is driven (①). That is, in the case of the measuring module with separate transmission and reception functions, the radar signal output from the transmitter is received by the receiver, in the case of the measuring module with integrated transmission and reception functions the reflected. radar signal is reflected and input by a reflector installed at a position corresponding to the propagation direction for radio waves.

In this way, the measuring module measures the intensity, speed, wavelength, or the combinations thereof of radio waves that are changed by media such as vinyl, snow, etc. (②), and the snowfall amount measuring device compares the measurement data measured by the measuring module with the reference data that has been previously stored (③).

Wherein, the reference data includes the propagation characteristics in accordance with vinyl information and snowfall amount, the vinyl information is information including Ingredient, material, thickness, or the combinations thereof, and propagation characteristics are information including the intensity, speed, wavelength, or the combinations thereof of radio waves according to snowfall amount.

The snowfall measuring device identifies the thickness of snow piled on the roof of the vinyl house based on the analysis and comparison between the measured data measured by the measuring module and the previously stored reference data (④).

The snowfall amount measuring device generates information including warning information comprising the thickness of the snow piled on the roof of the green house, warning information corresponding to the thickness of the snow, countermeasures or the combinations thereof, and then displays the corresponding information on the display provided in the snowfall amount measuring device, or transmits the corresponding information to a predetermined user terminal (⑤).

Accordingly, a user can perform an appropriate response on the basis of the information pertaining to the current snowfall amount information, the warning information, and the information related to the response plan, which are displayed on the snowfall amount measuring device or received from the snowfall amount measuring device.

Figure 3:
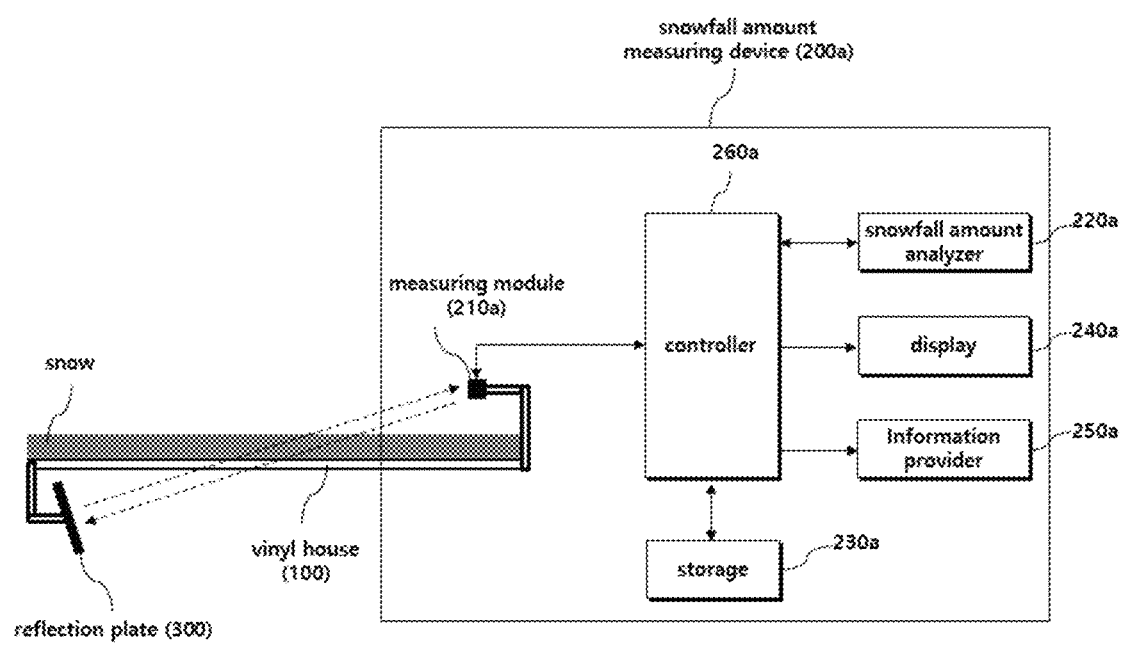
FIG. 3 and FIG. 4 are drawings for briefly showing the configurations of devices of measuring snowfall amount for a green house in accordance with another embodiment of the present invention.
Figure 4:
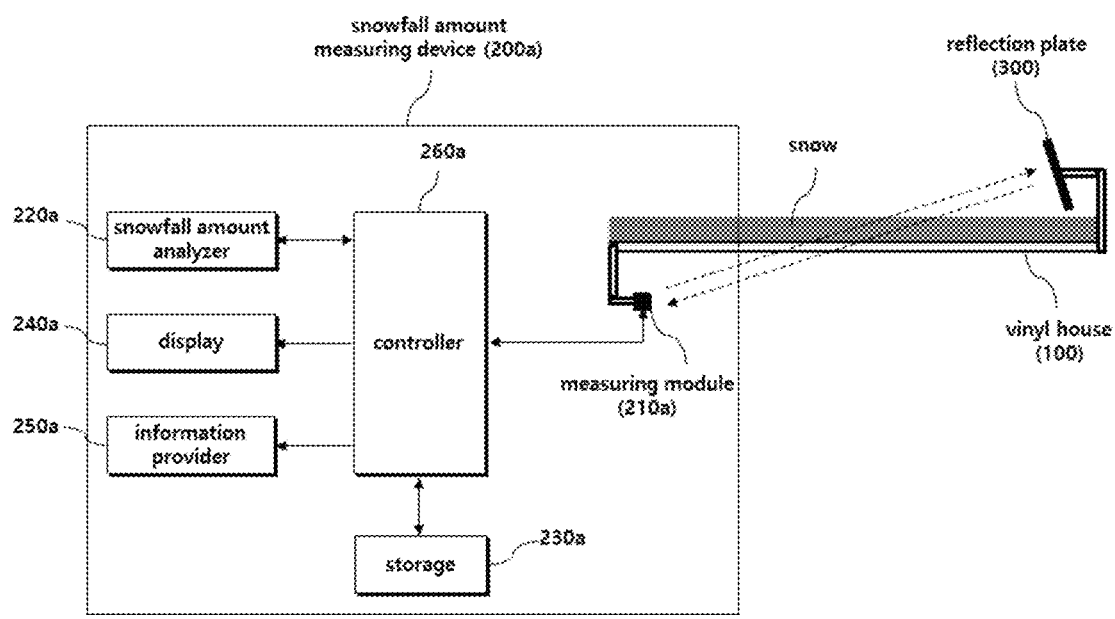

FIG. 2 to FIG. 4 are drawings for briefly showing the configuration of a device of measuring snowfall amount for a green house in each accordance with an embodiment of the present invention.

At first, as shown in FIG. 2, the apparatus in accordance with an embodiment of the present invention comprises a vinyl house 100 and a snowfall amount measuring device 200, and the snowfall amount measuring device 200 comprises a measuring module 210 which a transmitting function and a receving function are separated, a snowfall amount analyzer 220, a storage 230, a display 240, an information provider 250 and a controller 260.

The measuring module 210 measures the intensity, speed, wavelength, or the combinations thereof of the radio waves that are changed by the medium including the vinyl and the snow piled on the roof of the vinyl house, and outputs the measured data to the controller 260.

The measuring module 210 is a radar sensor that is separated into a transmitter 212 and a receiver 214 and is separately installed inside or outside the green house 100. That is as shown in FIG. 2, the transmitter 212 is installed outside the roof of the green house 100 and the receiver 214 is installed inside the roof of the green house 100. In addition, even not shown in FIGS., contrary to the installation method shown in FIG. 2., the transmitter 212 may be installed inside the roof of the green house 100 and the receiver 214 may be installed outside the roof of the green house 100.

The snowfall amount analyzer 220 compares the measured data measured by the measuring module 210 based on the control of the controller 260 with the reference data previously stored in the storage 230, and identifies the thickness of the snow piled on the roof of the green house 100, and then provides the thickness information to the controller 260.

In addition, the snowfall amount analyzer 220 may have a function of generating information data including warning information according to the thickness (i.e., snowfall amount) of the snow piled on the roof of the green house 100 under the control of the controller 260, countermeasures for the warning information, or the combinations thereof.

The storage 230 stores an execution program used by the snowfall measuring device 200 and stores the reference data for identifying the thickness of the snow accumulated on the roof of the green house.

At this time, the reference data includes vinyl information constituting the vinyl house and propagation characteristics according to each snowfall amount. The vinyl information is information including an ingredient, a material, a thickness, or the combinations thereof of vinyl, and the propagation characteristics are information including intensity, speed, wavelength, or the combinations thereof of respective radio waves for each snowfall amount.

In addition, the storage 230 stores user terminal information (for example, telephone number, e-mail address, etc.) to he provided with information data including the thickness of the snow on the roof of the green house 100, warning information corresponding to the thickness of the snow, countermeasures, or the combinations thereof.

The display 240 comprises a generally known LCD or LED, and performs a function of displaying information data including the thickness (i.e., snowfall amount) of snow accumulated on the roof of the green house 100 identified in the the snowfall amount analyzer 220 based on the control of the controller 260, warning information according to the thickness of snow (for example, warning level by degrees such as attention, caution, warning, etc.), countermeasures, or the combinations thereof.

The information provider 250 performs a function of transmitting the information data to a predetermined user terminal, in which the information data includes the thickness of the snow piled on the roof of the green house 100 identified in the snowfall amount analyzer 220 based on the control of the controller 260, warning information according to the thickness of snow, or the combinations thereof.

The controller 260 controls a function of measuring output and reception of radio waves, and the intensity, speed, and wavelength of the radio wave that is changed by medium such as vinyl or snow in the measuring module 210 in which the transmission function and the reception function are separated, and a function of controlling the identification of the thickness of snow piled on the roof of the vinyl house 100 based on comparison between the data measured by the measuring module 210 in the snowfall amount analyzer 220 and the reference data stored in the storage 230.

In addition, the controller 260 controls the generation of information data including warning information based on the thickness of snow piled up on the roof of the vinyl house identified by the snowfall amount analyzer 220, countermeasures, or the combinations thereof, and may additionally perform a function of displaying various information data according to the snowfall amount on the display 240 or transmitting the information data to a specific user terminal through the information provider 250. When displaying various information data related to the snowfall amount on the display 240, the controller 260 may simultaneously output the audio data through the speaker.

On the other hand, unlike the snowfall measuring device shown in FIG. 2 using a measuring module in which a transmission function and a reception function are separated, as shown in FIG. 3 and FIG. 4, a snowfall measuring device using a measuring module in which transmission and reception functions are integrated can be used.

That is, as shown in FIG. 3 and FIG. 4, the apparatus in accordance with another embodiment of the present invention comprises a green house 100, a snowfall measuring device 200a and a reflector 300, and the snowfall measuring device 200a comprises a measuring module 210a, a snowfall amount analyzer 220a, a storage 230a, a display 240a, an information provider 250a, and a controller 260a. Wherein the functions of the snowfall amount analyzer 220a, the storage 230a, the display 240a, and the information provider 250a are the same as those described above with reference to FIG. 2, and thus detailed descriptions thereof will be skipped.

The measuring module 210a is a radar sensor that integrates transmission and reception functions, and they are installed outside or inside the green house 100. The measuring module 210a receives the radio waves reflected by the reflection plate 300 installed at the position corresponding to the radio wave output direction, and measures the intensity, velocity(speed), wavelength or the combinations thereof of radio waves which is varied by medium including vinyl and snow deposited on the roof of a vinyl house, and then outputs the measured data to the controller 260a.

The reflection plate 300 is installed outside or inside the roof of the green house 100, which is a position corresponding to the position of the measuring module 210a installed inside or outside the green house 100. That is, as shown in FIG. 3, when the integrated measuring module 210a is installed to be connected to a support base on the outside of the roof of the vinyl house, the reflection plate 300 is installed inside the roof of the vinyl house 100. As shown in FIG. 4, when the integrated measuring module 210a is installed inside the roof of the green house 100, the reflection plate 300 is installed outside the roof of the green house 100.

The reflector 300 may be installed on the outside or inside of the roof of the green house 100 with an interval therebetween. That is, when the length and size of the green house 100 are so large that it is determined that the measurement of the snowfall amount is necessary at various points, the number of the reflection plates 300 can be increased. At this time, the measuring module may be configured to have the same number as the number of the reflection plates 300, or a driving means capable of moving the radio wave propagation output direction of the measuring module may be separately provided so that various points may be measured by using a single measuring module.

The reflection plate 300 is preferably formed of a metal such as iron or aluminum, which can normally reflect the electromagnetic wave very well. However, the reflection plate 300 is not limited thereto, and any material may be used as long as it is a material excellent in reflection characteristics of radio waves.

It is preferable that the measuring module 210a and the reflection plate 300 are installed on the outside of the roof or inside the roof of the green house 100 so as to be spaced from the inside or outside of the roof by a predetermined distance.

The reflection plate 300, as shown in FIG. 3 and FIG. 4, may be installed in a vertical shape if there is no problem in measuring the snowfall amount, other than the method of installing the reflector 300 at a predetermined angle.

The controller 260a controls the measurement of the radio wave output from the measuring module 210a integrated with the transmission and reception functions, the reception of the radio wave reflected by the reflection plate 300, and the measurement of the radio wave reflected by the reflection plate 300. The other functions are the same as those described with reference to FIG. 2, and a detailed description thereof will be omitted.

Hereinafter, an embodiment of a method for measuring snowfall amount for a green house in accordance with the present invention constructed as above will be described in detail with reference to FIG. 5. At this time, each step of the method of the present invention may be a sequence modified by usage environments and those skilled in the art.

Figure 5:
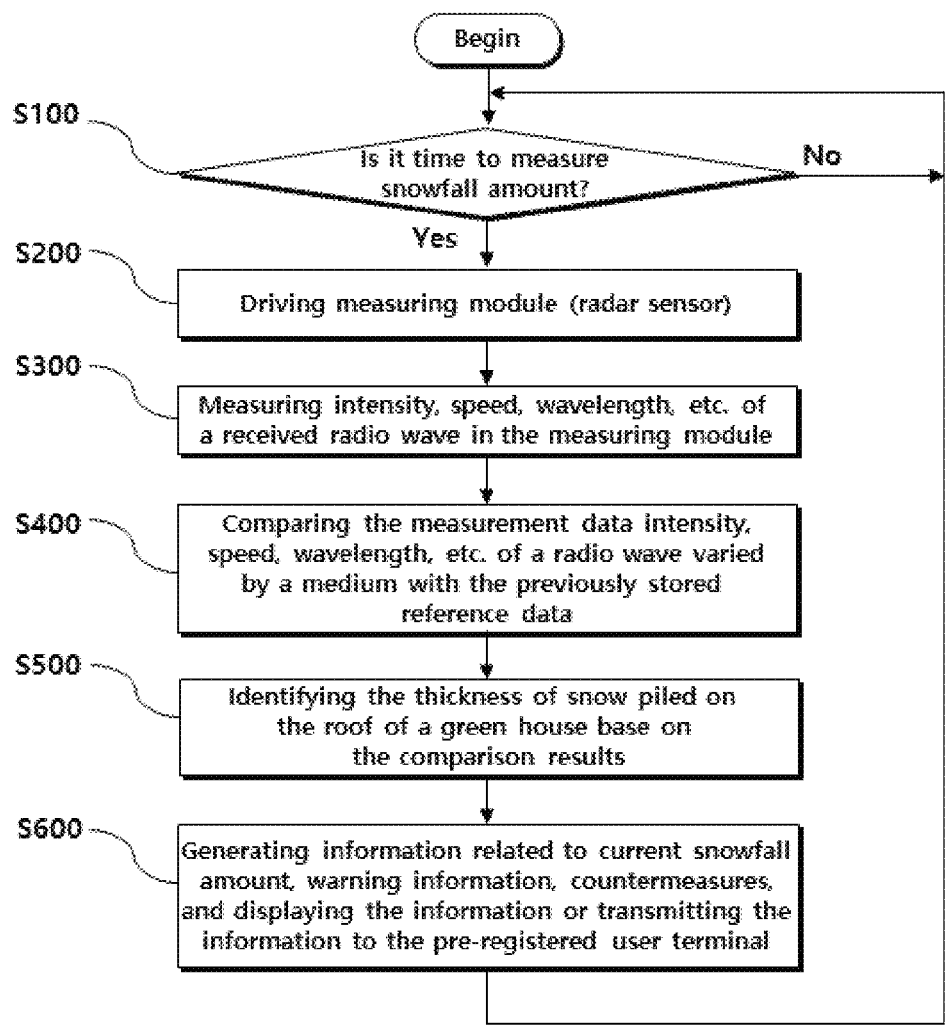
FIG. 5 is a flowchart for describing in details operational processes of a method of measuring snowfall amount for a green house in accordance with an embodiment of the present invention.

FIG. 5 is a flowchart for describing in details operational processes of a method of measuring snowfall amount for a green house in accordance with an embodiment of the present invention.

First, the snowfall amount measuring device determines whether it is time to measure how much snow is accumulated on the roof of the vinyl house (S100).

That is, it is decided whether it is time or not to become the snowfall amount measuring time point stored in the snowfall amount measuring device. At this time, the measuring time point may he determined based on operations by the user who manages the vinyl house, or may be determined based on controls of the central control center connected via network. In addition, and may be determined in advance with a specific date and time of the snowy season and can be stored in the storage.

As a result of the determination in step S100, when it is time to measure the snowfall amount, the snowfall amount measuring device drives the measuring module (S200), and performs the measurements including intensity, speed, wavelength, or the combinations thereof of a radio wave which is changed by a medium such as vinyl, snow or the like (S300). That is, as shown in FIG. 2, when the transmitter and the receiver use separate measuring modules, the radar signal output from the transmitter is received through the receiver, and as shown in FIG. 3 and. FIG. 4, when the measuring module in which the transmission and reception functions are integrated is used, the snowfall amount measuring device receives the signal reflected by the reflection plate provided in the direction of radio wave propagation output from the measuring module, and thus performs the measurements including intensity, speed, wavelength, or the combinations thereof.

When the measuring module is driven through S200 and S300 and the measurement data including intensity, speed, wavelength, or the combinations thereof are collected, the snowfall amount measuring device compares the measurement data measured in S300 with the reference data previously stored in the storage (i.e., table data pertaining to the radio wave propagation characteristics according to vinyl information and snowfall amount) (S400).

Then, the snowfall amount measuring device identifies the thickness of snow piled on the roof of the green house based on the comparison result in S400 (S500).

Thereafter, the snowfall amount measuring device generates information data including warning information, countermeasures for the warning information, or the combinations thereof according to the thickness of the snow on the basis of the thickness of the snow piled on the roof of the green house identified in S500, and displays the generated information through a display provided in the snowfall amount measuring device or transmits the information to a predetermined user terminal (S600).

That is, the snowfall amount measuring device generates related information pertaining to stepwise alert information such as attention, caution, warning, and the like according to thickness of snow based on the snowfall amount information identified in S500, countermeasures to be performed according to the stepwise alarm information, and displays the related information on the display, or immediately informs the user with character or voice data through the user terminal so that the user has a constant interest such as removing snow accumulated in the green house according to the snowfall amount.

As described above, the apparatus and method for measuring snowfall amount for a vinyl house in accordance with the present invention can acurately measure the thickness of snow piled on the roof of a green house by using radar sensor, which is impossible to measure the snowfall amount with conventional mainly used methods of measuring the amount of snowfall by using laser, and thus snowfall measurement system can he simplt built at low cost in accordance with the present invention, it is possible to accurately measure the snow on the roof of a vinyl house even in a special environment such as a vinyl house, and therefore it is possible to prevent the collapse of the vinyl house in the farmhouse due to heavy snowfall referring to the accurate measurement of snowfall.

Moreover, the apparatus and method for measuring snowfall amount for a vinyl house in accordance with the present invention uses a radar sensor separated by transmitter and receiver, or uses a reflector and a radar sensor integrated with transmission and reception functions, and accurately measures the thickness of the snow on the roof of a vinyl house, and thus it is possible to freely install and operate the snowfall measurement system according to the location, installation condition, structure of the vinyl house, and it makes maintenance very easy.

The present invention has been described with reference to an embodiment shown in the figures, which is an exemplification only and the various and equivalent embodiments are made possible by those who have ordinary knowledge in the area the present invention belongs to. Therefore, the technical scope of the present invention will be determined by the claims as follows.

What is claimed is:

1. An apparatus for measuring snowfall amount on a green house comprises:
    a measuring module condigured to measure intensity, speed, wavelength, or the combinations thereof of radio waves, which are varied by medium including vinyl and snow piled on the roof of a green house; and
    a snowfall amount analyzer configured to compare the measurement data measured by the measuring module with previously stored reference data, and identify the thickness of the snow piled on the roof of the green house;
    wherein the reference data is constructed as a table, which comprises vinyl information including composition, material, thickness, or the combinations thereof, and the propagation characteristics according to each previously measured snowfall amount.

2. The system of claim 1,
    wherein the measuring module comprises a radar sensor of which a transmitter and a receiver are separated, and the transmitter and the receiver are separately installed inside or outside the green house.

3. The system of claim 1,
    wherein the measuring module comprises a radar sensor of which a transmitter and a receiver are integrated, and the transmitter and the receiver are installed inside or outside the green house.

4. The system of claim 1,
    wherein the apparatus for measuring snowfall amount further comprises:
    a reflector installed at a position corresponding to the direction for radio waves output of the measuring module, and reflecting radio waves output from the measuring module.

5. The system of claim 4,
    wherein the reflector is installed outside or inside the roof of the green house, which corresponds to the position of the measuring module installed inside or outside the green house; and
    one or more of the reflector are installed at intervals in the green house.

6. The system of claim 1,
    wherein the apparatus for measuring snowfall amount further comprises:
    a display configured to display information data including thickness of snow piled on the roof of the green house which is identified by the snowfall amount analyzer, warning information corresponding to the thickness of the snow, countermeasures or the combinations thereof; and
    an information provider configured to transmit information data including thickness of snow piled on the roof of the green house which is identified by the snowfall amount analyzer, warning information corresponding to the thickness of the snow, countermeasures or the combinations thereof to a predetermined user terminal.

7. A method for measuring snowfall amount on a green house comprises:
    measuring, in an apparatus for measuring snowfall amount, intensity, speed, wavelength, or the combinations thereof of radio waves, which are varied by medium including vinyl and snow piled on the roof of a green house; and
    alanyzing a snowfall amount by comparing the measurement data measured by the measuring module with previously stored reference data, and identifying the thickness of the snow piled on the roof of the green house;
    wherein the reference data is constructed as a table, which comprises vinyl information including composition, material, thickness, or the combinations thereof, and the propagation characteristics according to each previously measured snowfall amount.

8. The method of claim 7,
    wherein the measuring comprises measuring intensity, speed, wavelength, or the combinations thereof of radio waves, which are varied by medium by using a measuring module comprising a radar sensor of which a transmitter and a receiver are separated, and the transmitter and the receiver are separately installed inside or outside the green house.

9. The method of claim 7, wherein the measuring comprises measuring intensity, speed, wavelength, or the combinations thereof of radio waves, which are varied by medium by using a measuring module comprising a radar sensor of which a transmitter and a receiver are integrated, and the transmitter and the receiver are installed inside or outside the green house.

10. The method of claim 9, the measuring module measuring intensity, speed, wavelength, or the combinations thereof of radio waves, which are varied by medium with receiving radio waves reflected through a reflector installed at a position corresponding to the direction for radio waves output of the measuring module; and the reflector is installed outside or inside the roof of the green house, which corresponds to the position of the measuring module installed inside or outside the green house, and one or more of the reflector are installed at intervals in the green house.

11. The system of claim 1, wherein the method for measuring snowfall amount further comprises:

displaying information data including thickness of snow piled on the roof of the green house which is identified by analyzing the snowfall amount, warning information corresponding to the thickness of the snow, countermeasures or the combinations thereof; and transmitting information data including thickness of snow piled on the roof of the green house which is identified by analyzing the snowfall amount, warning information corresponding to the thickness of the snow, countermeasures or the combinations thereof to a predetermined user terminal.

* * * * *